(12) United States Patent
Kubota et al.

(10) Patent No.: US 9,013,812 B2
(45) Date of Patent: Apr. 21, 2015

(54) IMAGING LENS

(71) Applicant: Optical Logic Inc., Nagano (JP)

(72) Inventors: Yoji Kubota, Nagano (JP); Kenichi Kubota, Nagano (JP); Hitoshi Hirano, Nagano (JP)

(73) Assignee: Optical Logic Inc., Nagano (JP)

(*) Notice: Subject to any disclaimer, the term of this patent is extended or adjusted under 35 U.S.C. 154(b) by 0 days.

(21) Appl. No.: 14/181,758

(22) Filed: Feb. 17, 2014

(65) Prior Publication Data
US 2014/0160582 A1    Jun. 12, 2014

Related U.S. Application Data

(63) Continuation of application No. PCT/JP2012/069298, filed on Jul. 30, 2012.

(30) Foreign Application Priority Data

Aug. 18, 2011    (JP) .................. 2011-179176

(51) Int. Cl.
*G02B 13/04* (2006.01)
*G02B 9/04* (2006.01)
*G02B 13/00* (2006.01)
*G02B 9/34* (2006.01)
*G02B 9/60* (2006.01)

(52) U.S. Cl.
CPC . *G02B 13/04* (2013.01); *G02B 9/60* (2013.01); *G02B 9/04* (2013.01); *G02B 9/34* (2013.01); *G02B 13/0045* (2013.01)

(58) Field of Classification Search
CPC ............... G02B 13/003; G02B 13/004; G02B 13/0045; G02B 13/04; G02B 9/04; G02B 9/60

USPC .......................... 359/753, 691, 793, 714, 781
See application file for complete search history.

(56) References Cited

U.S. PATENT DOCUMENTS

| 5,933,286 A | 8/1999 | Yamada et al. |
| 6,989,941 B2 * | 1/2006 | Tomioka ................ 359/680 |
| 2007/0206295 A1 | 9/2007 | Yamashita et al. |

FOREIGN PATENT DOCUMENTS

| JP | 10-39206 A | 2/1998 |
| JP | 2003-307674 A | 10/2003 |
| JP | 2006-284620 A | 10/2006 |
| JP | 2007-233152 A | 9/2007 |

* cited by examiner

*Primary Examiner* — Zachary Wilkes
(74) *Attorney, Agent, or Firm* — Kubotera & Associates, LLC

(57) ABSTRACT

An imaging lens includes a first lens group having negative refractive power; a stop; and a second lens group having positive refractive power, arranged in the order from the object side to the image plane side. The first lens group includes a first lens having a strong concave surface facing the image plane side and negative refractive power; and a second lens having negative refractive power and a biconcave lens shape near the optical axis. The second lens group includes a third lens having a biconvex shape; and a lens group that is composed of a lens having positive refractive power and a lens having negative refractive power, and has negative refractive power as a whole. The first lens group has a focal length F1 and the second lens group has a focal length F2 so that the following conditional expression is satisfied:

$-1.0 < F1/F2 < -0.5$.

9 Claims, 12 Drawing Sheets

IMAGING LENS

CROSS-REFERENCE TO RELATED APPLICATIONS

This is a continuation application of a PCT application No. PCT/JP2012/069298, filed on Jul. 30, 2012, which claims priority of Japanese Patent Application No. 2011-179176, filed on Aug. 18, 2011.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for being mounted in a relatively small camera such as a vehicle onboard camera, a digital still camera, a security camera, and a network camera.

In these years, some vehicles are equipped with a plurality of cameras for a purpose of enhancing convenience and security. For example, in case of a vehicle equipped with a backup camera to take an image behind the vehicle, a driver can see the rear view of the vehicle on a monitor upon backing up the vehicle. Accordingly, it is possible to safely move the vehicle backward without hitting an object even if such an object is not visible from the driver due to shadow of the vehicle.

Such a camera mounted on a vehicle, i.e., a so-called onboard camera, has been increasingly applied each year. In these days, there has been available a system that can process images taken by onboard cameras, which are wide-angle respectively attached on four positions of a vehicle (backdoor, front grill, and side mirrors), so as to be able to display an image of the vehicle as if viewed from above. With increase of application of such onboard cameras, the onboard cameras are required to have an ability of imaging in wider range with high resolution. Therefore, in addition to a small size thereof, an imaging lens for mounting in an onboard camera is required to have a wide angle of view and an ability of satisfactorily correct aberrations. However, in case of an imaging lens, it is difficult to achieve downsizing while satisfactorily correct aberrations and increase the angle of view, i.e., widening of an angle of view. Upon actual designing of an imaging lens, it is critical to achieve those demands in a well-balanced manner.

As an imaging lens having a wide angle of view, for example, there is an imaging lens described in Patent Reference. The imaging lens includes in the order from an object side: a first lens that is negative and has a shape of a meniscus lens directing a convex surface thereof to the object side; a second lens that is similarly negative and has a shape of a meniscus lens directing a convex surface thereof to the object side; a stop; a third lens having a biconvex shape; a fourth lens that is negative and has a shape of a meniscus lens directing a convex surface thereof to the object side; and a fifth lens having a biconvex shape. According to the configuration, by restraining within a certain range a ratio between the distance from a second principal point of a front group, which is composed of the first lens and the second lens, to the stop and the distance from the second principal point of the front group to a first principal point of a rear group, which is composed of the third lens to the fifth lens, it is achievable to obtain downsizing and satisfactory correction of aberrations.

Patent Reference: Japanese Patent Application Publication No. 2003-307674

According to the imaging lens described in Patent Reference, it is achievable to obtain a wide angle of view, although the number of lenses that compose the imaging lens is as few as five, and to obtain relatively satisfactorily correction of aberrations. However, since a total length of the lens system is long, it does not meet demands for downsizing in these years, and there still remain some challenges for attaining both downsizing of the imaging lens and satisfactory aberration correction. Here, such issue is not specific to an imaging lens for mounting in an onboard camera, but is common for imaging lenses for mounting in a relatively small-sized camera, such as a digital still camera, a security camera, and a network camera.

In view of the problems of the conventional techniques described above, an object of the present invention is to provide an imaging lens that has a wide angle of view and can satisfactorily correct aberrations in spite of a small size thereof.

SUMMARY OF THE INVENTION

According to the present invention, an imaging lens includes a first lens group having negative refractive power; a stop; and a second lens group having positive refractive power, arranged in the order from the object side to the image plane side. The first lens group includes a first lens that directs a strong concave surface thereof to the image plane side and has negative refractive power; and a second lens that has negative refractive power and has a shape of a biconcave lens near the optical axis. The second lens group includes a third lens having a biconvex shape; and a lens group that is composed of two lenses, a lens having positive refractive power and a lens having negative refractive power, and has negative refractive power as a whole. According to the invention, when the first lens group has a focal length F1 and the second lens group has a focal length F2, the imaging lens having the configuration satisfies the following conditional expression (1):

$$-1.0 < F1/F2 < -0.5 \qquad (1)$$

Typically, in order to achieve a wide angle in an imaging lens, the negative refractive power of the first lens tends to be strong. According to the invention, since the second lens having negative refractive power is disposed on the image plane side of the first lens, increase of the refractive power of the first lens accompanied with the widening of the angle is restrained, and increase of a chromatic aberration of magnification and distortion, which occur in the first lens, are restrained. According to the configuration, since there are two lenses, the first lens and the second lens, which have negative refractive power, it is achievable to keep the maximum effective diameter of the first lens small and to obtain downsizing of the imaging lens. In addition, among them, the first lens is formed in a shape directing a concave surface thereof to the image plane side and the second lens is formed to have a biconcave shape directing a concave surface thereof to the object side, so that field curvature generated in the first lens is suitably corrected by the object-side surface of the second lens.

When the imaging lens satisfies the conditional expression (1), it is possible to restrain a distortion, a chromatic aberration, and a field curvature within satisfactory ranges while attaining downsizing of the imaging lens. When the value exceeds the upper limit of "−0.5", the refractive power of the second lens group is weak relative to that of the first lens group, so that, although it is advantageous to secure a back focal length, it is difficult to achieve downsizing. In addition, the negative distortion increases and an axial chromatic aberration is excessively corrected (a focal position at a short wavelength moves to the image plane side relative to a focal position at a reference wavelength). The image-forming surface curves to the image plane side, which results in so-called excessively corrected state. Therefore, it is difficult to obtain satisfactory image-forming performance.

On the other hand, when the value is below the lower limit of "−1.0", the refractive power of the first lens group is strong relative to that of the second lens group, so that, although it is advantageous for downsizing of the imaging lens, the back focal length is short, and it is difficult to secure space to dispose an insert such as infrared cutoff filter and cover glass. Moreover, an axial chromatic aberration is insufficiently corrected (a focal position at a short wavelength moves to the object side relative to a focal position at a reference wavelength). An image-forming surface curves to the object side, which causes so-called insufficiently corrected state. Therefore, also in this case, it is difficult to obtain satisfactory image-forming performance.

According to the imaging lens having the above-described configuration, the first lens is preferably formed in a shape of a meniscus lens directing a concave surface thereof to the image plane side. With such shape of the first lens, it is easy to restrain negative distortion.

According to the imaging lens having the above-described configuration, the lens group that composes the second lens group is preferably composed by joining a lens having positive refractive power and a lens having negative refractive power. By forming the lens group for disposing most closely to the image plane side by joining the two lenses, positive and negative lenses, it is possible to restrain a spherical aberration and a field curvature within suitable ranges while suitably correcting the chromatic aberration.

When the first lens has a focal length f1 and the second lens has a focal length f2, the imaging lens having the above-described configuration preferably satisfies the following conditional expression (2):

$$0.2 < f1/f2 < 1.5 \tag{2}$$

When the imaging lens satisfies the conditional expression (2), it is achievable to satisfactorily correct aberrations. When the value exceeds the upper limit of "1.5", since the first lens has weak refractive power relative to the second lens, a chromatic aberration of the image periphery due to off-axis light flux is excessively corrected, and a coma aberration and a negative distortion increase. In addition, in the astigmatism, a sagittal image surface tilts to the image plane side and the astigmatic difference increases, so that it is difficult to obtain satisfactory image-forming performance. On the other hand, when the value is below the lower limit of "0.2", the second lens has weak refractive power relative to the first lens, so that, although it is advantageous for correction of a coma aberration and downsizing of the imaging lens, it is difficult to secure a back focal length. Moreover, an off-axis chromatic aberration of magnification is insufficiently corrected (an image-forming point at a short wavelength moves in a direction to be close to the optical axis, relative to an image-forming point at a reference wavelength). Also in this case, it is difficult to obtain satisfactory image-forming performance.

When the whole lens system has a focal length f and the third lens has a focal length f3, the imaging lens having the above-described configuration preferably satisfies the following conditional expression (3):

$$1.0 < f3/f < 2.5 \tag{3}$$

When the imaging lens satisfies the conditional expression (3), it is achievable to satisfactorily correct the off-axis coma aberration and the astigmatism while attaining downsizing of the imaging lens. When the value exceeds the upper limit of "2.5", the third lens has weak refractive power relative to the whole lens system, and the positive refractive power is weak in the whole lens system, so that, although it is advantageous for correction of the axial chromatic aberration, it is difficult to achieve downsizing. In addition, since an inner coma aberration due to an off-axis light flux increases, it is difficult to obtain satisfactory image-forming performance. On the other hand, when the value is below the lower limit of "1.0", the third lens has strong refractive power relative to the whole lens system, so that, although it is advantageous for downsizing of the imaging lens, it is difficult to secure the back focal length. In addition, the astigmatic difference increases and the axial and off-axis chromatic aberrations are both insufficiently corrected, so that it is difficult to obtain satisfactory image-forming performance.

In the lens group that composes the second lens group, when the lens having positive refractive power has a focal length fp and the lens having negative refractive power has a focal length fn, the imaging lens having the above-described configuration preferably satisfies the following conditional expression (4):

$$0.7 < |fp/fn| < 1.5 \tag{4}$$

When the imaging lens satisfies the conditional expression (4), it is possible to restrain the field curvature within a satisfactory range while satisfactorily correcting the chromatic aberration. When the value exceeds the upper limit of "1.5", the lens having negative refractive power in the lens group that composes the second lens group has relatively strong refractive power, and the off-axis chromatic aberration is excessively corrected. In addition, the spherical aberration and the field curvature are excessively corrected, and it is difficult to restrain those aberrations within satisfactory ranges. On the other hand, when the value is below the lower limit of "0.7", the axial and the off-axis chromatic aberrations are insufficiently corrected and the field curvature increases, so that it is difficult to obtain satisfactory image-forming performances.

When the lens group that composes the second lens group includes a fourth lens having positive refractive power and a fifth lens having negative refractive power, arranged in the order from the object side, and the fourth lens has Abbe's number vdp and the fifth lens has Abbe's number vdn, the imaging lens having the above-described configuration preferably satisfies the following conditional expression (5):

$$vdp > vdn \tag{5}$$

By disposing the fifth lens having negative refractive power on the image plane side and having the Abbe's number of the fifth lens smaller than that of the fourth lens as shown in the conditional expression (5), it is achievable to suitably restrain generation of the distortion while satisfactorily correcting a chromatic aberration of magnification generated in the first lens.

According to the imaging lens of the invention, it is achievable to obtain a wide angle in the imaging lens and satisfactory aberration correction and to provide a small-sized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, and 10 are schematic sectional views of imaging lenses in Numerical Data Examples 1 to 4 according to the embodiment, respectively. Since a basic lens configuration is the same among those Numerical Data Examples, the lens configuration of the embodiment will be described with reference to the illustrative sectional view of Numerical Data Example 1.

Figure 1:
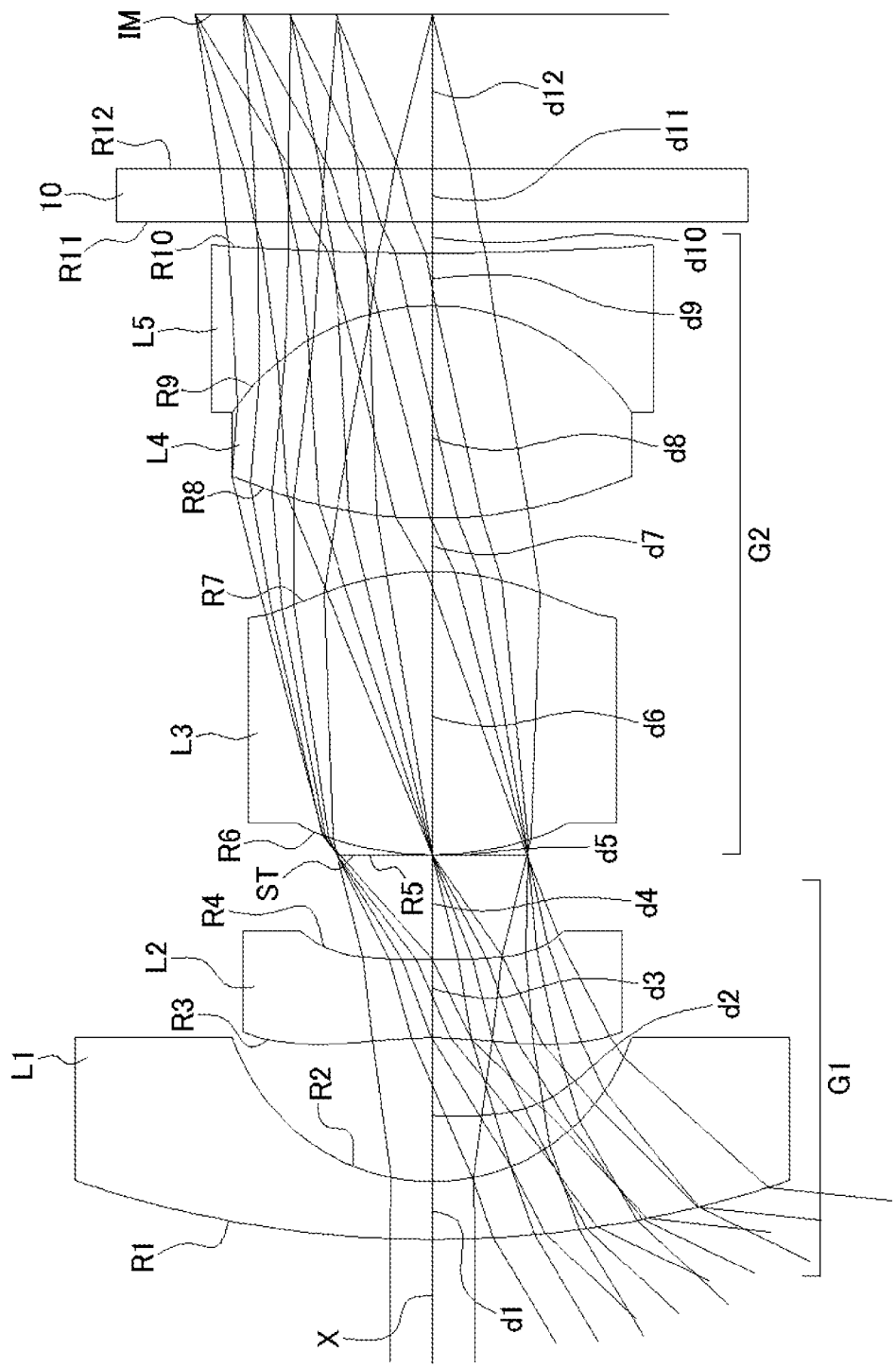
FIG. 1 shows a sectional view of a schematic configuration of an imaging lens in Numerical Data Example 1 according to an embodiment of the invention.

As shown in FIG. 1, the imaging lens of the embodiment includes a first lens group G1 having negative refractive power; a stop ST; and a second lens group G2 having positive refractive power, arranged in the order from an object side to an image plane side. Among them, the first lens group G1 includes a first lens L1 having negative refractive power, and a second lens L2 having negative refractive power, arranged in the order from the object side to the image plane side. On the other hand, the second lens group G2 includes a third lens L3 having positive refractive power, a fourth lens L4 having positive refractive power, and a fifth lens L5 having negative refractive power. According to the embodiment, the fourth lens L4 and the fifth lens L5 composes a lens group. Here, a filter 10 may be provided between the fifth lens L5 and an image plane IM. The filter 10 may be optionally omitted.

The first lens L1 is formed so as to have a shape of a meniscus lens directing a strong concave surface thereof to the image plane side. More specifically, the first lens L1 is formed to have a shape of a meniscus lens, in which an image plane-side surface thereof is more strongly curved than an object-side surface thereof. Here, the first lens L1 is not limited to the one having a shape of a meniscus lens directing a concave surface thereof to the image plane side, but can be formed as a biconcave lens directing a concave surface thereof to the image plane side.

The second lens L2 is formed in a shape such that a curvature radius of an object-side surface thereof is negative and a curvature radius of an image plane-side surface thereof is positive, so as to have a shape of a biconcave lens near an optical axis X. Among them, the object-side surface of the second lens L2 has an inflexion point. More specifically, the object-side surface of the second lens L2 has a shape so as to direct a concave surface thereof to the object side near the optical axis X, and direct a convex surface thereof to the object side at the periphery. With such shape, the object-side surface of the second lens L2 is formed in a shape such that negative refractive power becomes gradually weaker as it goes to the periphery from the optical axis X, so that the distortion generated at the first lens L1 is satisfactorily corrected.

In the second lens group G2, the third lens L3 is formed to have a biconvex shape. Similarly, the fourth lens L4 is also formed to have a biconvex shape. The fifth lens L5 is formed to have a biconcave shape. Among them, the fourth lens L4 and the fifth lens L5 are joined to each other. Here, the fourth lens L4 and the fifth lens L5 can be disposed being separated from each other. By separating those lenses from each other, it is easy to use different types of materials, for example, use glass as a material of the fourth lens L4 and plastic as a material of the fifth lens L5.

In addition, the shape of the fourth lens L4 is not limited to the biconvex shape. It can be a shape of a meniscus lens directing a convex surface thereof to the object side or a shape of a meniscus lens directing a concave surface thereof to the object side. Similarly, the shape of the fifth lens L5 is not limited to a biconcave shape. It can be a shape of a meniscus lens directing a convex surface thereof to the object side or a shape of a meniscus lens directing a concave surface thereof to the object side. Here, the lens group that compose the second lens group G2 simply has to be composed of the two lenses, a lens having positive refractive power and a lens having negative refractive power. The lens group can be also composed of a lens having negative refractive power and a lens having positive refractive power, arranged in the order from the object side.

The imaging lens of the embodiment satisfies the following conditional expressions. As such, according to the imaging lens of the embodiment, it is achievable to provide a small-sized imaging lens and to obtain both wide angle and satisfactory aberration correction.

$$-1.0 < F1/F2 < -0.5 \quad (1)$$

$$0.2 < f1/f2 < 1.5 \quad (2)$$

$$1.0 < f3/f < 2.5 \quad (3)$$

$$0.7 < |fp/fn| < 1.5 \quad (4)$$

$$vdp > vdn \quad (5)$$

In the above conditional expressions:
f: Focal length of the whole lens system
F1: Focal length of a first lens group G1
F2: Focal length of a second lens group G2
f1: Focal length of a first lens L1
f2: Focal length of a second lens L2
f3: Focal length of a third lens L3
fp: Focal length of a fourth lens L4
fn: Focal length of a fifth lens L5
vdp: Abbe's number of the fourth lens L4
vdn: Abbe's number of the fifth lens L5

Here, it is not necessary to satisfy all of the conditional expressions, and it is achievable to obtain an effect corresponding to the respective conditional expression when any single one of the conditional expressions is individually satisfied.

In the embodiment, all lens surfaces of any lenses are formed as an aspheric surface as necessary. When the aspheric surfaces applied to the lens surfaces have an axis Z in a direction of the optical axis X, a height H in a direction perpendicular to the optical axis X, a conical coefficient k, and aspheric coefficients $A_4, A_6, A_8, A_{10}, A_{12}, A_{14}$, and $A_{16}$, a shape of the aspheric surfaces of the lens surfaces is expressed as follows:

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ [Formula 1]

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line (a reference wavelength), and νd represents Abbe's number for the d line, respectively. Here, aspheric surfaces are indicated with surface numbers i affixed with * (asterisk). For a reference purpose, a sum of surface spacing from an object-side surface of the first lens L1 to the image plane IM (length in air) is indicated as La.

Numerical Data Example 1

Basic data are shown below.

f = 1.69 mm, Fno = 2.1, ω = 83.8°
Unit: mm

Surface Data

| Surface Number i | R | d | Nd | νd |
|---|---|---|---|---|
| (Object) | ∞ | ∞ | | |
| 1 | 10.625 | 0.550 | 1.8042 | 46.5 |
| 2 | 2.000 | 1.371 | | |
| 3* | −4.201 | 0.745 | 1.5312 | 56.0 |
| 4* | 74.434 | 0.991 | | |
| 5 (Stop) | ∞ | 0.000 | | |
| 6* | 3.198 | 2.698 | 1.5312 | 56.0 |
| 7* | −2.532 | 0.507 | | |
| 8 | 4.706 | 2.021 | 1.7725 | 49.6 (=νdp) |
| 9 | −2.281 | 0.500 | 1.9229 | 20.9 (=νdn) |
| 10 | 28.290 | 0.300 | | |
| 11 | ∞ | 0.500 | 1.5163 | 64.1 |
| 12 | ∞ | 1.476 | | |
| (Image plane) | ∞ | | | |

Aspheric Surface Data

Third Surface k = −1.751E−01, $A_4$ = 6.768E−02, $A_6$ = −1.157E−02, $A_8$ = 3.337E−04, $A_{10}$ = 2.697E−04, $A_{12}$ = 2.538E−04, $A_{14}$ = −1.105E−04, $A_{16}$ = 1.049E−05

-continued f = 1.69 mm, Fno = 2.1, ω = 83.8°
Unit: mm

Fourth Surface k = 0.000, $A_4$ = 9.800E−02, $A_6$ = −2.548E−02, $A_8$ = 7.400E−02, $A_{10}$ = −9.734E−02, $A_{12}$ = 4.625E−02, $A_{14}$ = 8.352E−03, $A_{16}$ = −7.932E−03

Sixth Surface k = 0.000, $A_4$ = 4.279E−03, $A_6$ = 1.224E−02, $A_8$ = −1.018E−02, $A_{10}$ = 2.640E−03

Seventh Surface k = 0.000, $A_4$ = 8.042E−03, $A_6$ = 6.357E−03, $A_8$ = −2.012E−03, $A_{10}$ = 6.520E−04

F1 = −1.97 mm
F2 = 2.50 mm
f1 = −3.15 mm
f2 = −7.46 mm
f3 = 3.18 mm
fp = 2.28 mm
fn = −2.27 mm
La = 11.49 mm

The values of the respective conditional expressions are as follows:

$F1/F2 = -0.79$ $f1/f2 = 0.42$ $f3/f = 1.88$ $|fp/fn| = 1.00$

Accordingly, the imaging lens of Numerical Data Example 1 satisfies conditional expressions (1) to (5).

Figure 2:
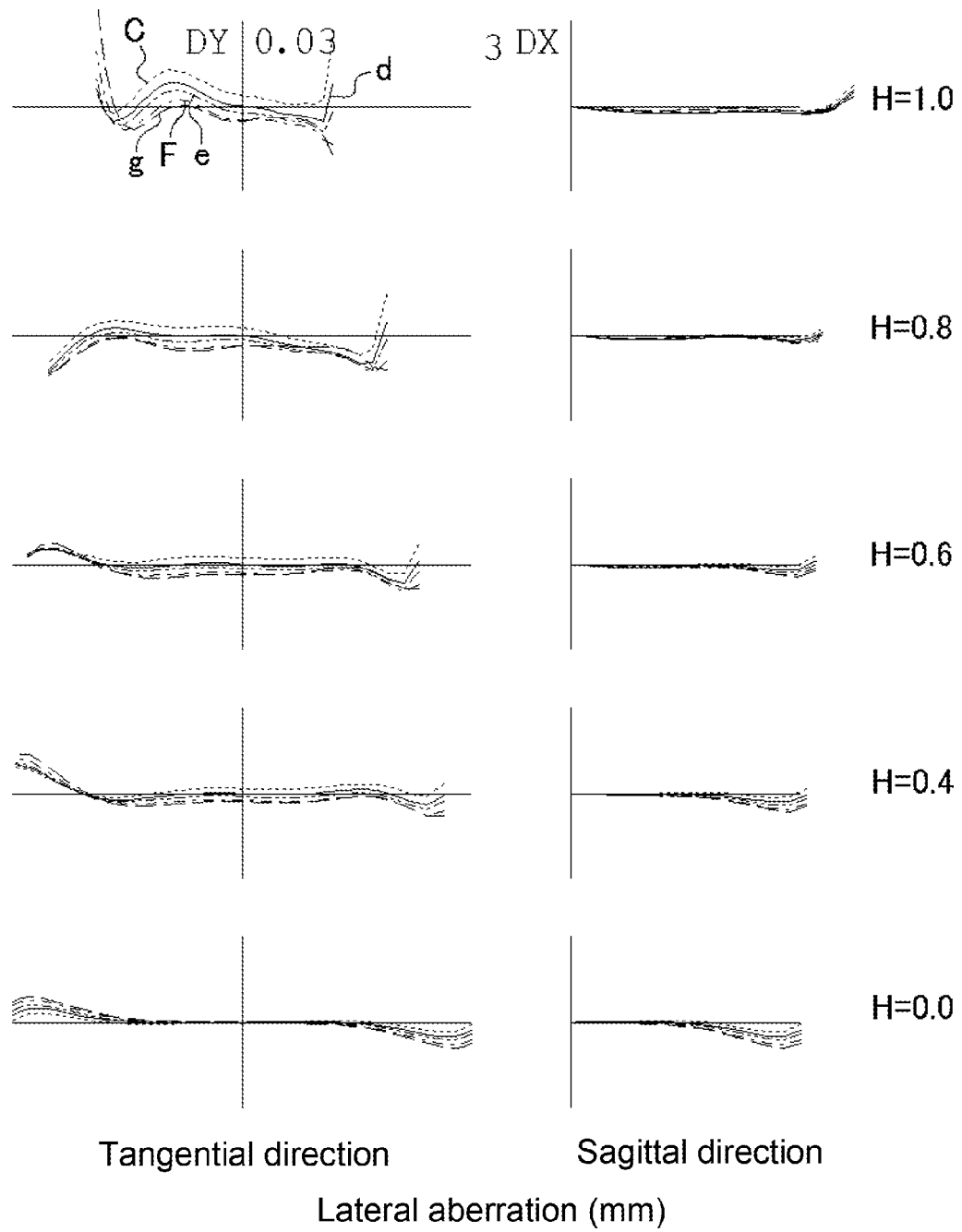
FIG. 2 is an aberration diagram showing a lateral aberration of the imaging lens of FIG. 1.
Figure 3:
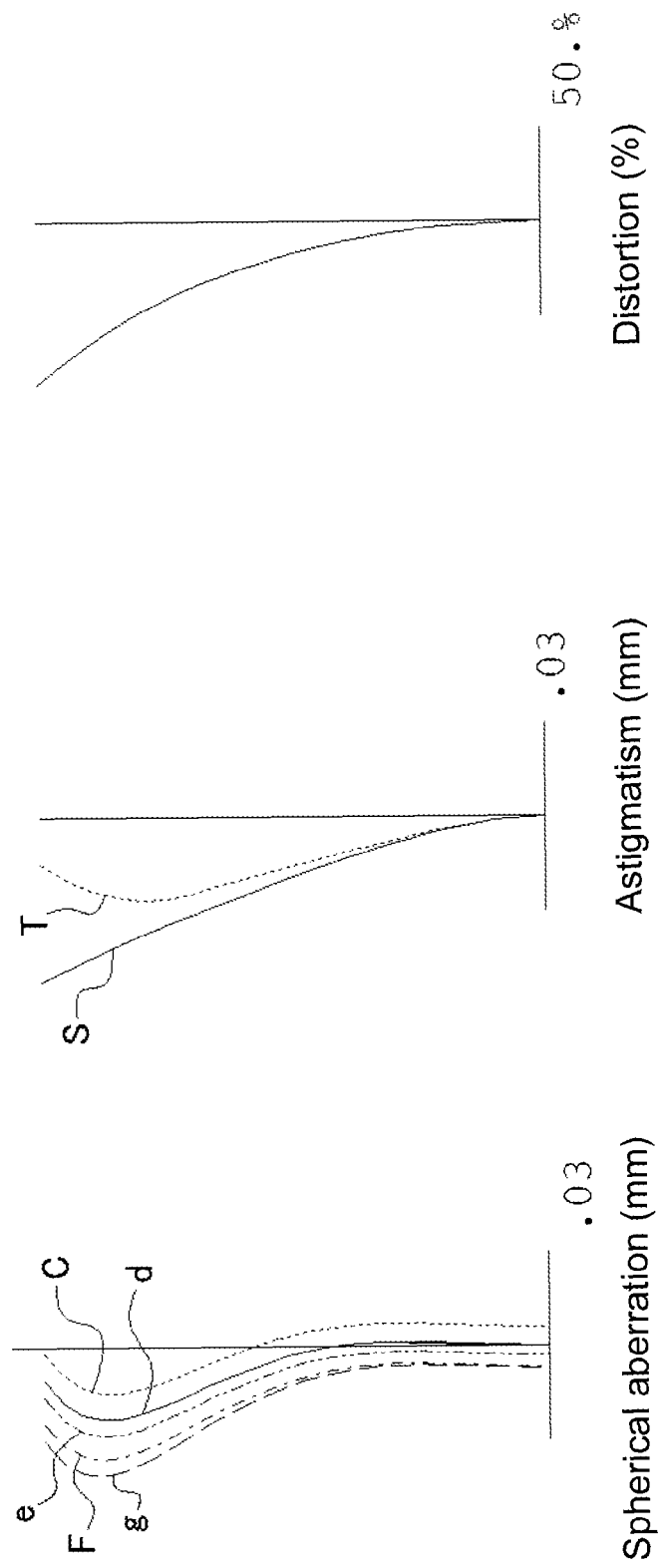
FIG. 3 is an aberration diagram showing a spherical aberration, astigmatism, and a distortion of the imaging lens of FIG. 1.
Figure 4:
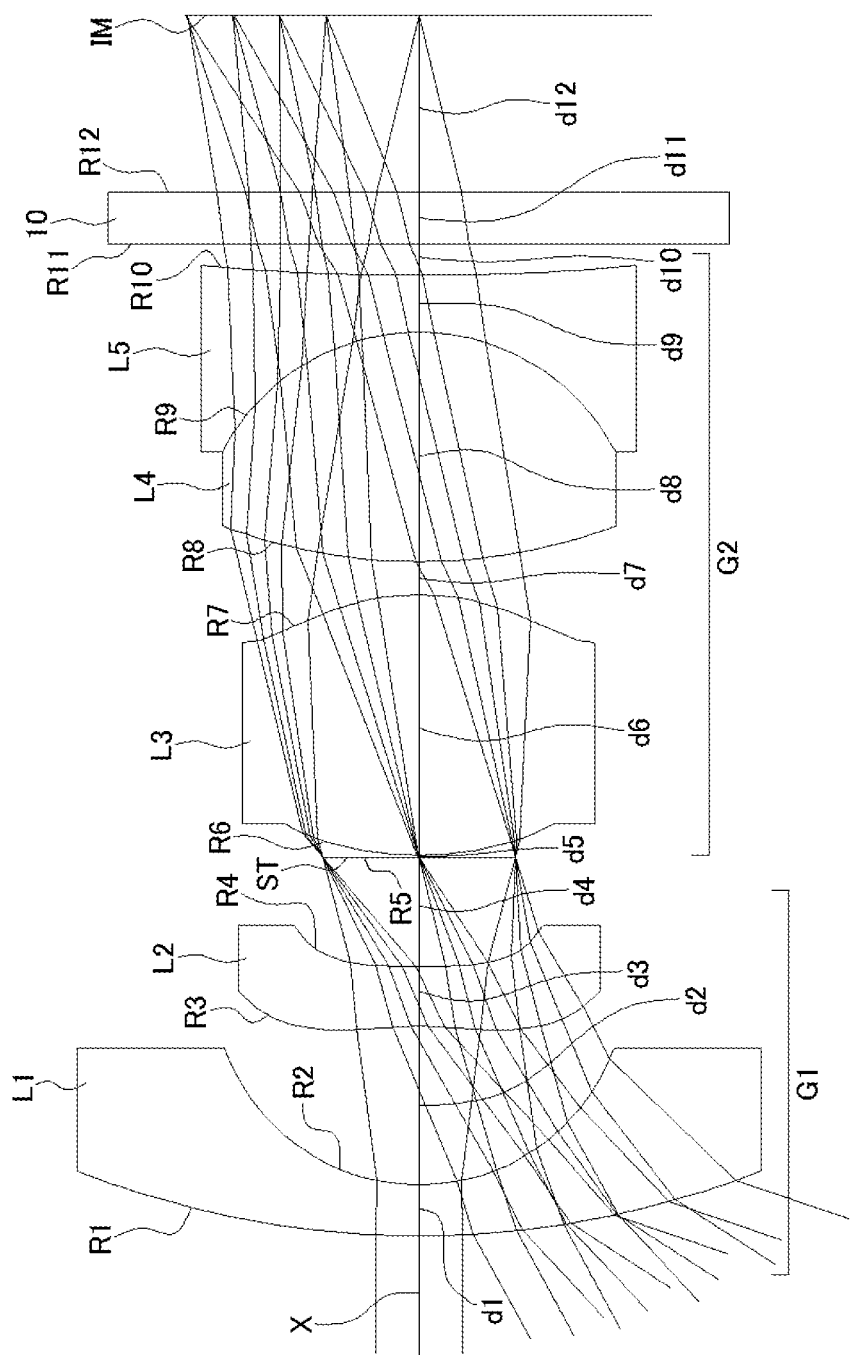
FIG. 4 shows a sectional view of a schematic configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, and 11) in the imaging lens of Numerical Data Example 1. Furthermore, FIG. 3 shows a spherical aberration (mm), astigmatism (mm), and a distortion (%), respectively, in the imaging lens of Numerical Data Example 1. In the aberration diagrams, for the lateral aberration diagrams and spherical aberration diagrams, aberrations at each wavelength, i.e. a g line (435.84 nm), an F line (486.13 nm), an e line (546.07 nm), a d line (587.56 nm), and a C line (656.27 nm) are indicated. In the astigmatism diagrams, an aberration on a sagittal image surface S and an aberration on a tangential image surface T are respectively indicated (which are the same in FIGS. 6, 9, and 12). As shown in FIGS. 2 and 3, according to the imaging lens of Numerical Data Example 1, the aberrations are satisfactorily corrected.

Numerical Data Example 2

Basic data are shown below.

f = 1.81 mm, Fno = 2.2, ω = 71.2°
Unit: mm

Surface Data

| Surface Number i | R | d | Nd | νd |
|---|---|---|---|---|
| (Object) | ∞ | ∞ | | |
| 1 | 9.000 | 0.492 | 1.7725 | 49.6 |

-continued f = 1.81 mm, Fno = 2.2, ω = 71.2°
Unit: mm

| | | | |
|---|---|---|---|
| 2 | 2.000 | 1.531 | |
| 3* | −4.261 | 0.579 | 1.4970 | 81.6 |
| 4* | 50.000 | 1.054 | | |
| 5 (Stop) | ∞ | 0.020 | | |
| 6* | 3.563 | 2.510 | 1.4970 | 81.6 |
| 7* | −2.317 | 0.320 | | |
| 8 | 5.374 | 2.211 | 1.8061 | 40.7 (=vdp) |
| 9 | −2.139 | 0.550 | 1.9229 | 20.9 (=vdn) |
| 10 | 23.860 | 0.300 | | |
| 11 | ∞ | 0.500 | 1.5163 | 64.1 |
| 12 | ∞ | 1.709 | | |
| (Image plane) | ∞ | | | |

Aspheric Surface Data

Third Surface $k = -1.006\text{E}-01, A_4 = 1.202\text{E}-01, A_6 = -3.649\text{E}-02, A_8 = 1.036\text{E}-02,$
$A_{10} = -1.036\text{E}-03$ Fourth Surface $k = 0.000, A_4 = 1.589\text{E}-01, A_6 = -9.360\text{E}-03, A_8 = -7.936\text{E}-03,$
$A_{10} = 6.558\text{E}-03, A_{12} = 9.546\text{E}-03, A_{14} = 4.096\text{E}-03,$
$A_{16} = -3.543\text{E}-03$ Sixth Surface $k = 0.000, A_4 = 1.114\text{E}-02, A_6 = 1.291\text{E}-02, A_8 = -1.037\text{E}-02,$
$A_{10} = 3.039\text{E}-03$ Seventh Surface $k = 0.000, A_4 = 4.497\text{E}-03, A_6 = 1.453\text{E}-02, A_8 = -6.108\text{E}-03,$
$A_{10} = 1.583\text{E}-03$ F1 = −2.11 mm
F2 = 2.55 mm
f1 = −3.43 mm
f2 = −7.87 mm
f3 = 3.29 mm
fp = 2.19 mm
fn = −2.11 mm
La = 11.61 mm The values of the respective conditional expressions are as follows:

$F1/F2 = -0.83$ $f1/f2 = 0.44$ $f3/f = 1.82$ $|fp/fn| = 1.04$

Accordingly, the imaging lens of Numerical Data Example 2 satisfies conditional expressions (1) to (5).

Figure 5:
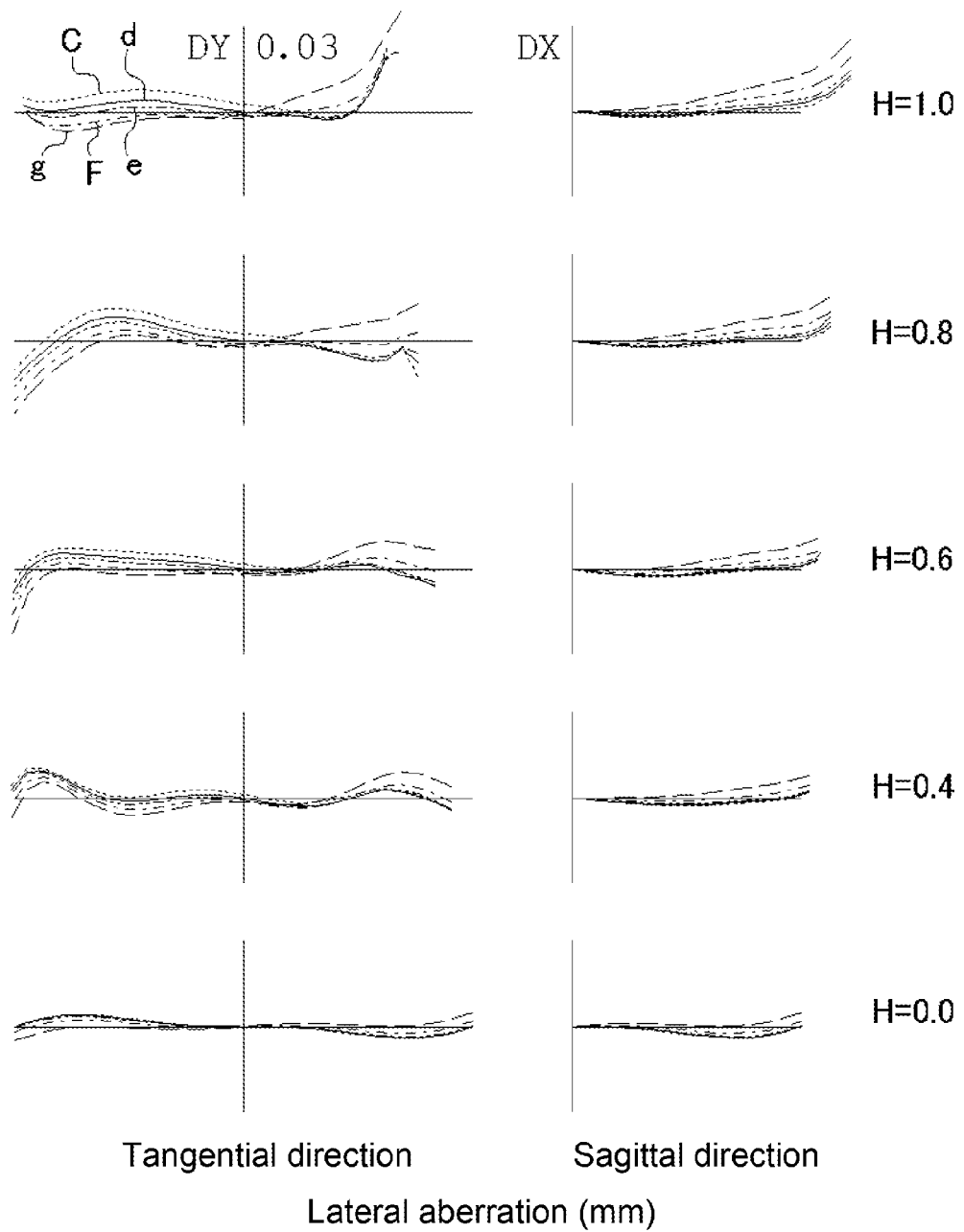
FIG. 5 is an aberration diagram showing a lateral aberration of the imaging lens of FIG. 4.
Figure 6:
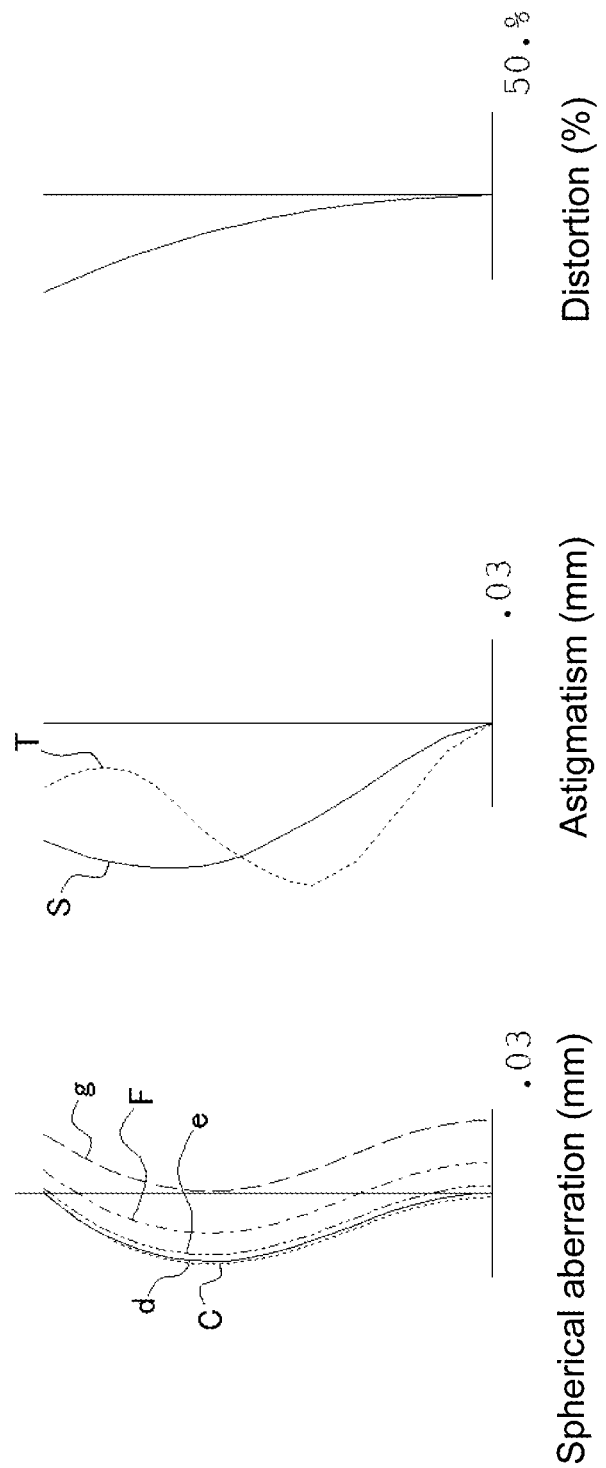
FIG. 6 is an aberration diagram showing a spherical aberration, astigmatism, and a distortion of the imaging lens of FIG. 4.
Figure 7:
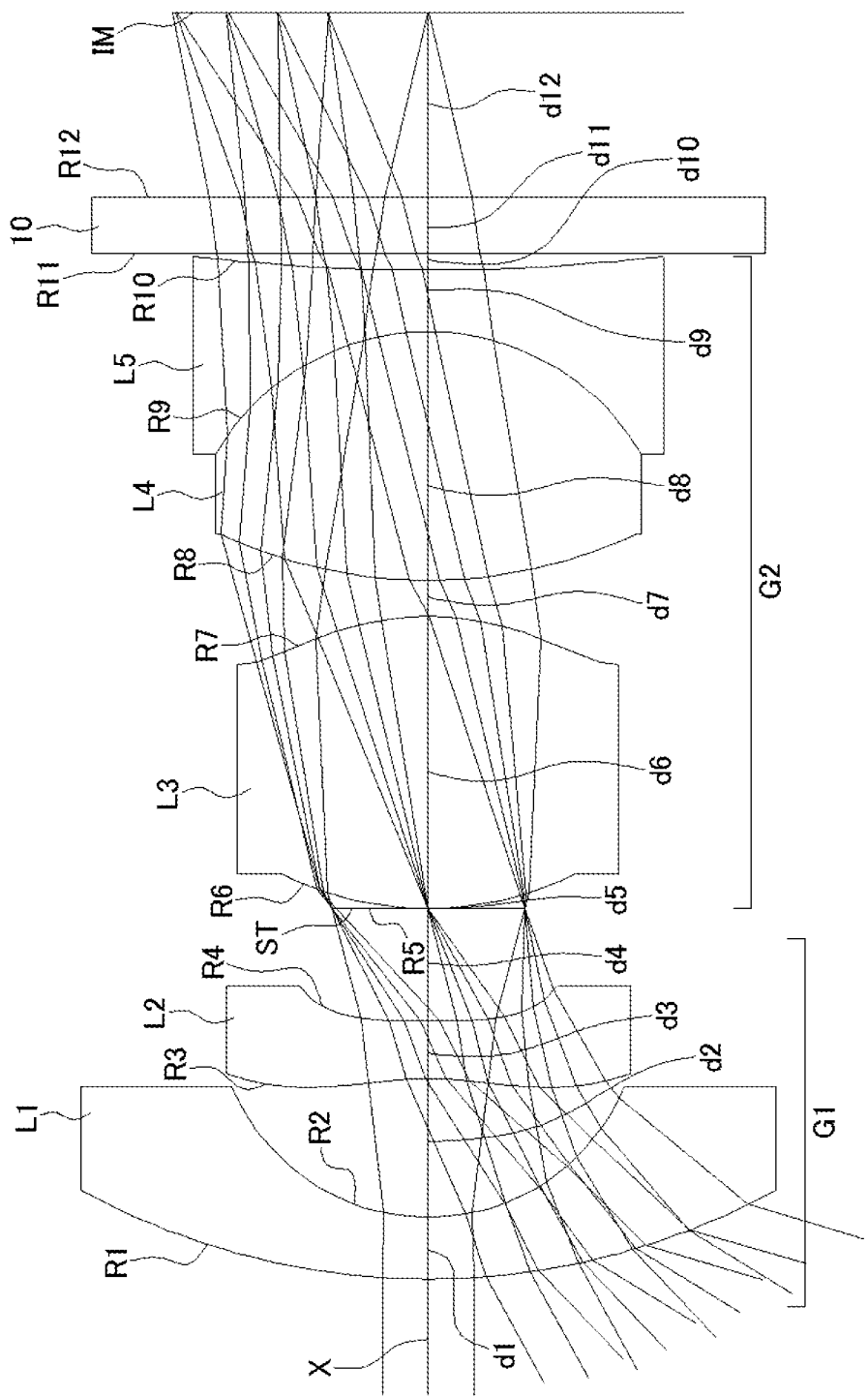
FIG. 7 shows a sectional view of a schematic configuration of an imaging lens in Numerical Data Example 3 according to the embodiment of the invention.

FIG. 5 shows the lateral aberration that corresponds to the image height ratio H, and FIG. 6 shows a spherical aberration (mm), astigmatism (mm), and a distortion (%), respectively, in the imaging lens of Numerical Data Example 2. As shown in FIGS. 5 and 6, according to the imaging lens of Numerical Data Example 2, the aberrations are satisfactorily corrected.

Numerical Data Example 3

Basic data are shown below.

f = 1.81 mm, Fno = 2.2, ω = 73.8°
Unit: mm

Surface Data

| Surface Number i | R | d | Nd | vd |
|---|---|---|---|---|
| (Object) | ∞ | ∞ | | |
| 1 | 6.435 | 0.550 | 1.8042 | 46.5 |
| 2 | 1.898 | 1.236 | | |
| 3* | −3.007 | 0.516 | 1.5312 | 56.0 |
| 4* | 150.000 | 1.000 | | |
| 5 (Stop) | ∞ | 0.000 | | |
| 6* | 3.259 | 2.600 | 1.5312 | 56.0 |
| 7* | −2.466 | 0.320 | | |
| 8 | 4.347 | 2.211 | 1.7725 | 49.6 (=vdp) |
| 9 | −2.201 | 0.550 | 1.9229 | 20.9 (=vdn) |
| 10 | 18.103 | 0.150 | | |
| 11 | ∞ | 0.500 | 1.5163 | 64.1 |
| 12 | ∞ | 1.644 | | |
| (Image plane) | ∞ | | | |

Aspheric Surface Data

Third Surface $k = 0.000, A_4 = 1.234\text{E}-01, A_6 = -3.962\text{E}-02, A_8 = 9.652\text{E}-03,$
$A_{10} = -1.037\text{E}-03$ Fourth Surface $k = 0.000, A_4 = 1.506\text{E}-01, A_6 = -1.162\text{E}-03, A_8 = -5.841\text{E}-03,$
$A_{10} = 3.129\text{E}-03, A_{12} = 6.550\text{E}-03, A_{14} = 3.767\text{E}-03,$
$A_{16} = -1.680\text{E}-03$ Sixth Surface $k = 0.000, A_4 = 1.086\text{E}-02, A_6 = 1.191\text{E}-02, A_8 = -1.117\text{E}-02,$
$A_{10} = 2.390\text{E}-03$ Seventh Surface $k = 0.000, A_4 = 5.589\text{E}-03, A_6 = 1.365\text{E}-02, A_8 = -6.439\text{E}-03,$
$A_{10} = 1.599\text{E}-03$ F1 = −1.93 mm
F2 = 2.35 mm
f1 = −3.54 mm
f2 = −5.54 mm
f3 = 3.14 mm
fp = 2.22 mm
fn = −2.10 mm
La = 11.11 mm The values of the respective conditional expressions are as follows:

$F1/F2 = -0.82$ $f1/f2 = 0.64$ $f3/f = 1.73$ $|fp/fn| = 1.06$

Accordingly, the imaging lens of Numerical Data Example 3 satisfies conditional expressions (1) to (5).

Figure 8:
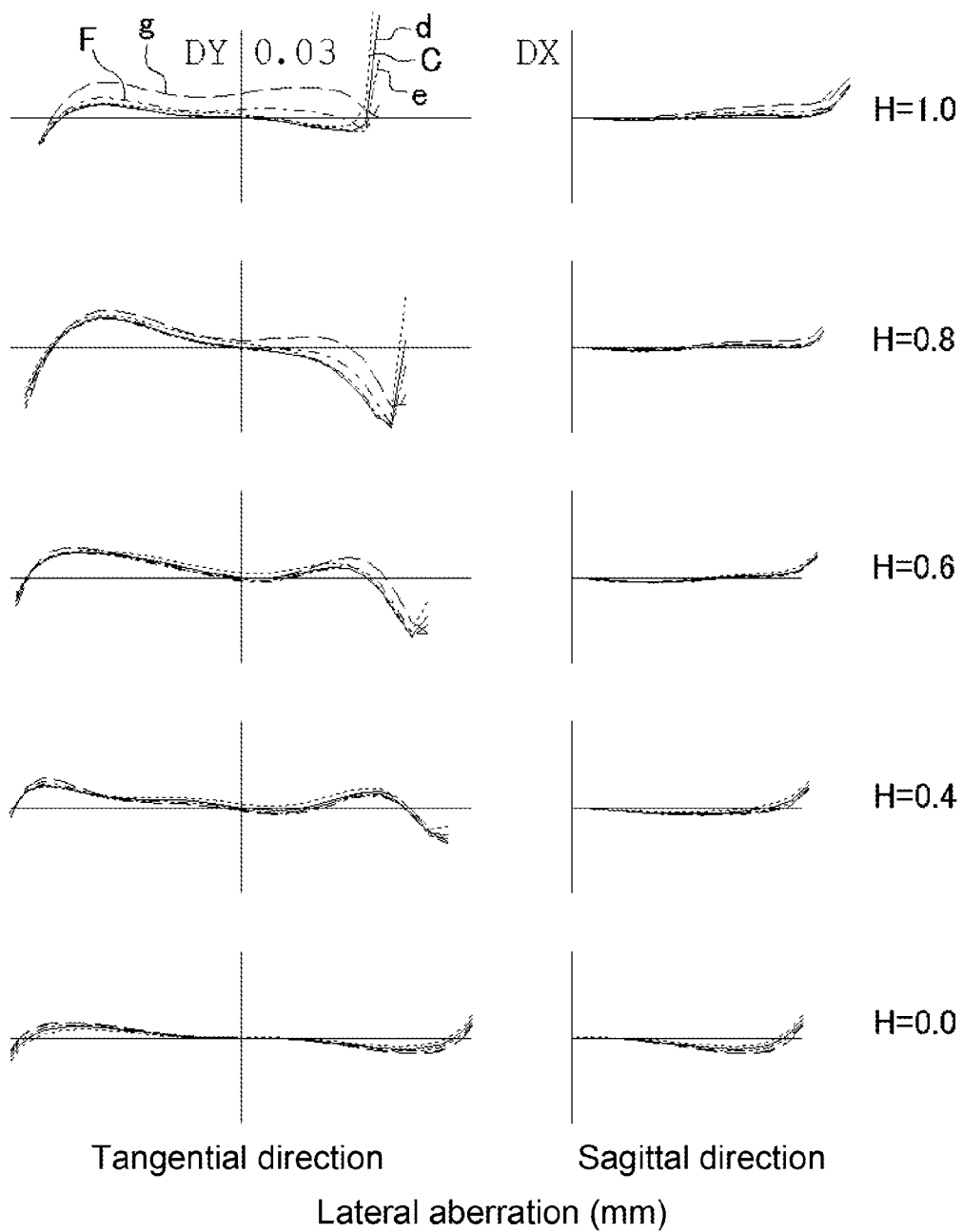
FIG. 8 is an aberration diagram showing a lateral aberration of the imaging lens of FIG. 7.
Figure 9:
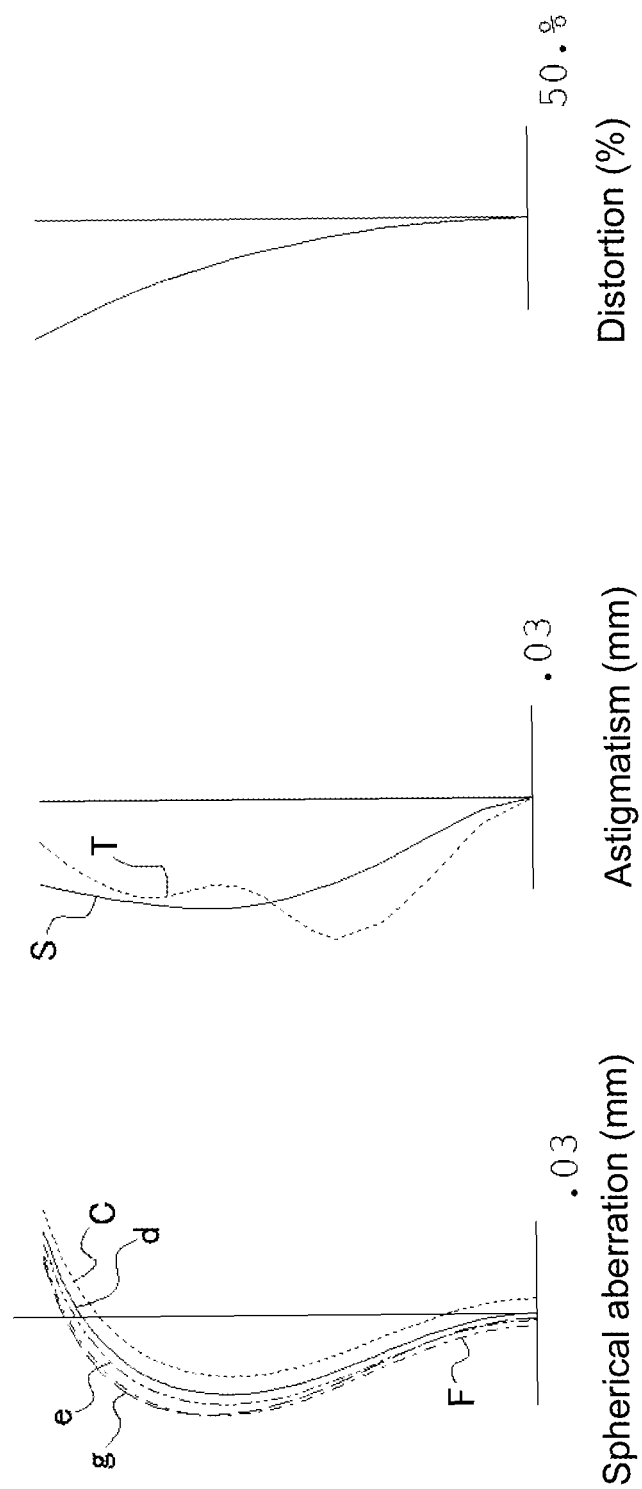
FIG. 9 is an aberration diagram showing a spherical aberration, astigmatism, and a distortion of the imaging lens of FIG. 7.
Figure 10:
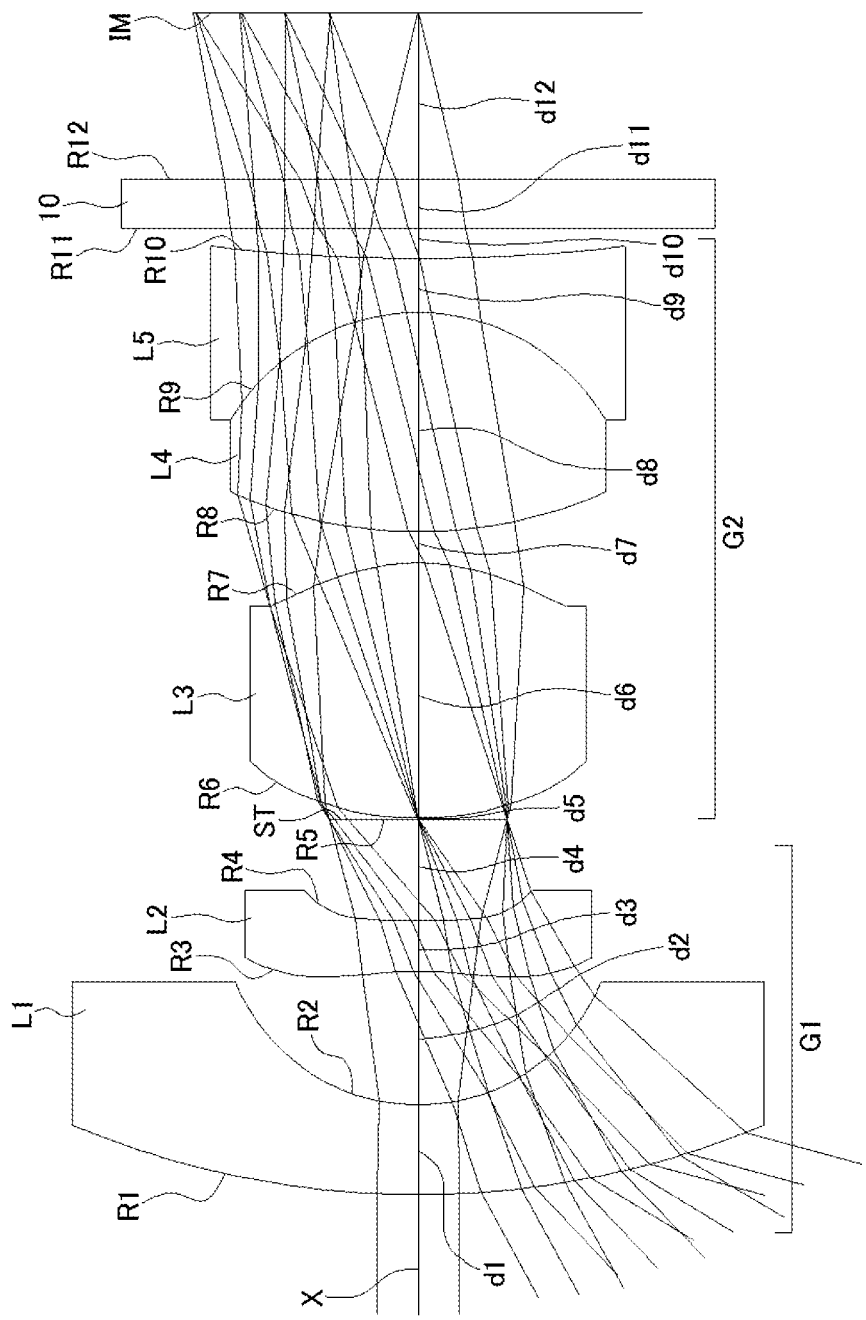
FIG. 10 shows a sectional view of a schematic configuration of an imaging lens in Numerical Data Example 4 according to the embodiment of the invention.

FIG. 8 shows the lateral aberration that corresponds to the image height ratio H of the imaging lens and FIG. 9 shows a spherical aberration (mm), astigmatism (mm), and a distortion (%), respectively, in the imaging lens of Numerical Data Example 3. As shown in FIGS. 8 and 9, according to the imaging lens of Numerical Data Example 3, the aberrations are satisfactorily corrected.

Numerical Data Example 4

Basic data are shown below.

| f = 1.81 mm, Fno = 2.2, ω = 74.9° Unit: mm | | | | |
|---|---|---|---|---|
| Surface Data | | | | |
| Surface Number i | R | d | Nd | vd |
| (Object) | ∞ | ∞ | | |
| 1 | 9.109 | 0.906 | 1.8042 | 46.5 |
| 2 | 2.000 | 1.351 | | |
| 3* | −3.422 | 0.513 | 1.4970 | 81.6 |
| 4* | 150.000 | 1.021 | | |
| 5 (Stop) | ∞ | 0.020 | | |
| 6* | 3.505 | 2.574 | 1.4970 | 81.6 |
| 7* | −2.342 | 0.320 | | |
| 8 | 4.709 | 2.211 | 1.8061 | 40.7 (=vdp) |
| 9 | −2.204 | 0.550 | 1.9229 | 20.9 (=vdn) |
| 10 | 17.911 | 0.300 | | |
| 11 | ∞ | 0.500 | 1.5163 | 64.1 |
| 12 | ∞ | 1.677 | | |
| (Image plane) | ∞ | | | |

Aspheric Surface Data

Third Surface $k = 8.758E-02, A_4 = 1.226E-01, A_6 = -3.857E-02, A_8 = 9.747E-03, A_{10} = -1.055E-03$ Fourth Surface $k = 0.000, A_4 = 1.552E-01, A_6 = -4.032E-03, A_8 = -7.084E-03, A_{10} = 3.828E-03, A_{12} = 7.414E-03, A_{14} = 3.805E-03, A_{16} = -2.501E-03$ Sixth Surface $k = 0.000, A_4 = 1.009E-02, A_6 = 1.286E-02, A_8 = -1.063E-02, A_{10} = 2.381E-03$ Seventh Surface $k = 0.000, A_4 = 4.848E-03, A_6 = 1.354E-02, A_8 = -6.414E-03, A_{10} = 1.593E-03$ F1 = −2.01 mm
F2 = 2.47 mm
f1 = −3.38 mm
f2 = −6.72 mm
f3 = 3.31 mm
fp = 2.17 mm
fn = −2.10 mm
La = 11.77 mm The values of the respective conditional expressions are as follows:

$F1/F2 = -0.81$ $f1/f2 = 0.50$ $f3/f = 1.83$ $|fp/fn| = 1.03$

Accordingly, the imaging lens of Numerical Data Example 4 satisfies conditional expressions (1) to (5).

Figure 11:
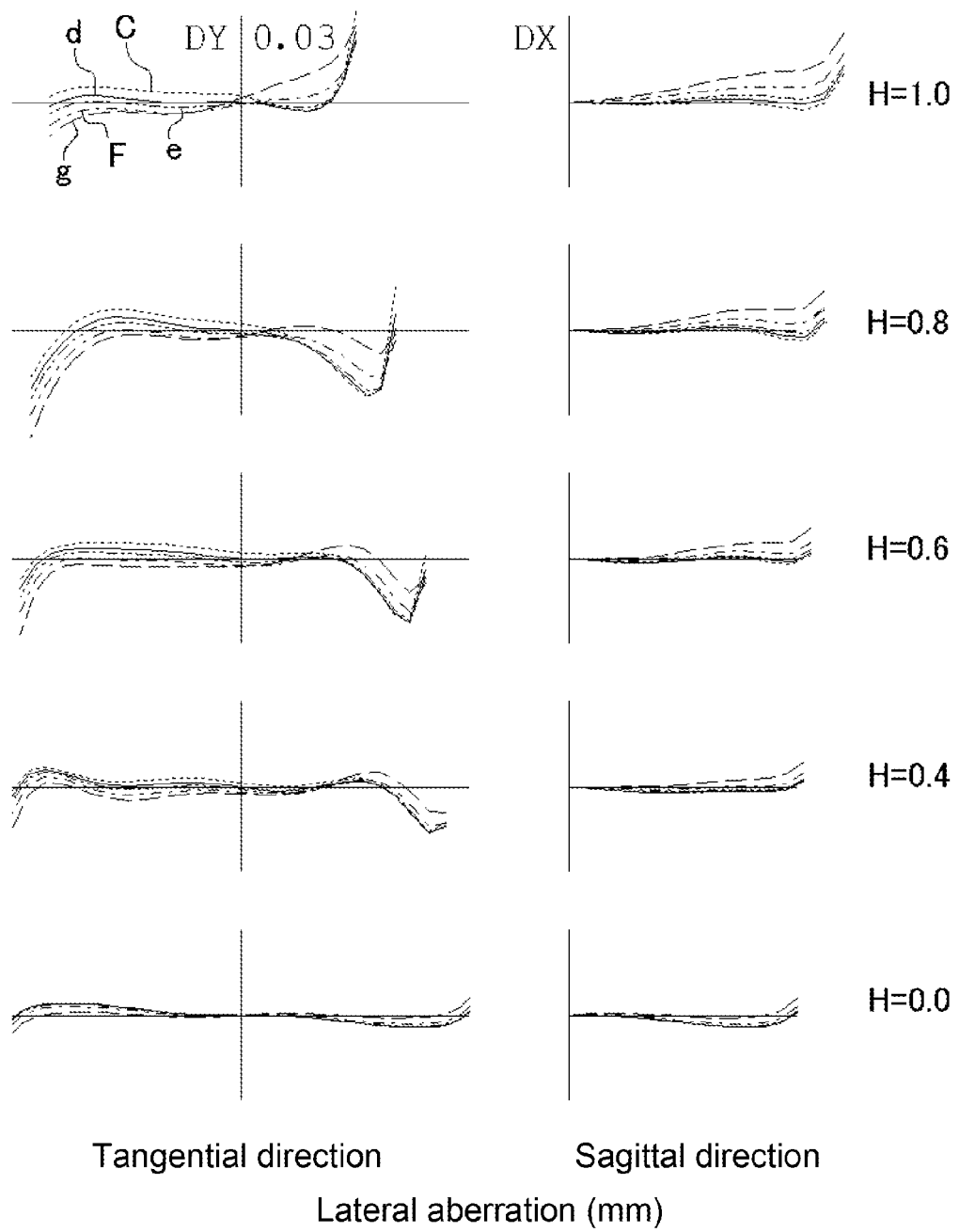
FIG. 11 is an aberration diagram showing a lateral aberration of the imaging lens of FIG. 10.
Figure 12:
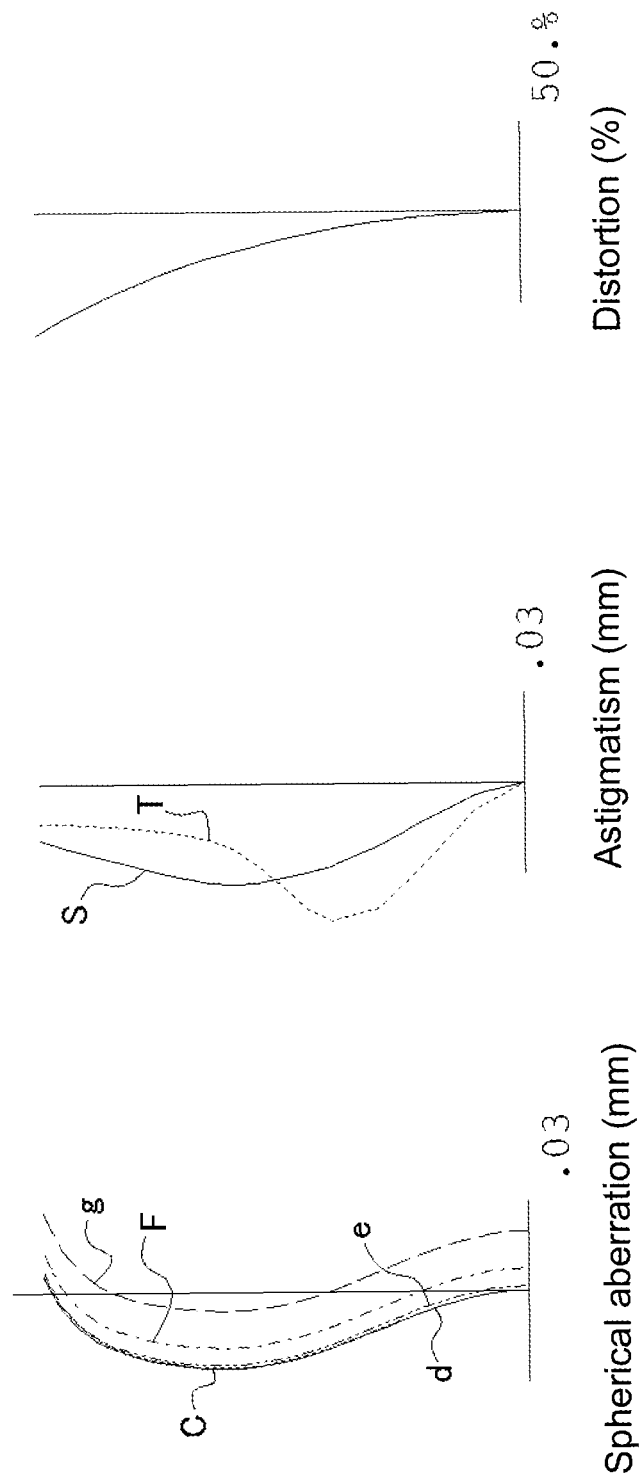
FIG. 12 is an aberration diagram showing a spherical aberration, astigmatism, and a distortion of the imaging lens of FIG. 10.

FIG. 11 shows the lateral aberration that corresponds to the image height ratio H of the imaging lens and FIG. 12 shows a spherical aberration (mm), astigmatism (mm), and a distortion (%), respectively, in the imaging lens of Numerical Data Example 4. As shown in FIGS. 11 and 12, according to the imaging lens of Numerical Data Example 4, the aberrations are satisfactorily corrected.

Here, according to each Numerical Data Example, a surface of each lens is formed as an aspheric surface as necessary, but if there is certain flexibility in the total length of the imaging lens or required optical performances, it is also possible to form all or a part of the lens surfaces as spherical surfaces.

Accordingly, when the imaging lens of the embodiment is applied in an imaging optical system such as an onboard camera, a digital still camera, a security camera, and a network camera, it is achievable to provide a small-sized camera with satisfactorily corrected aberrations in spite of a wide angle thereof.

The present invention is applicable in a device that requires a wide imaging range as an imaging lens and satisfactory aberration correction ability, for example, an imaging lens for mounting in an onboard camera or a security camera.

The disclosure of Japanese Patent Application No. 2011-179176, filed on Aug. 18, 2011, is incorporated in the application.

While the invention has been explained with reference to the specific embodiments of the invention, the explanation is illustrative and the invention is limited only by the appended claims.

What is claimed is:

1. An imaging lens comprising:
a first lens group having negative refractive power;
a stop; and
a second lens group having positive refractive power, arranged in the order from an object side to an image plane side,
wherein said first lens group includes a first lens having a strong concave surface facing the image plane side and negative refractive power; and a second lens having negative refractive power and a shape of a biconcave lens near an optical axis thereof,
said second lens group includes a third lens having a biconvex shape and a lens group,
said lens group is composed of a lens having positive refractive power and a lens having negative refractive power, and has negative refractive power as a whole,
said first lens group has a focal length F1 and said second lens group has a focal length F2 so that the following conditional expression is satisfied:

$-1.0 < F1/F2 < -0.5$ said first lens has a focal length f1 and said second lens has a focal length f2 so that the following conditional expression is satisfied:

$0.2 < f1/f2 < 1.5$.

2. The imaging lens according to claim 1, wherein said first lens is formed in a meniscus shape having the concave surface facing the image plane side.

3. The imaging lens according to claim 1, wherein said lens group of the second lens group is formed through joining the lens having positive refractive power and the lens having negative refractive power.

4. The imaging lens according to claim 1, wherein said third lens has a focal length f3 so that the following conditional expression is satisfied:

$1.0 < f3/f < 2.5$.

where f is a focal length of a whole lens system.

5. The imaging lens according to claim 1, wherein said lens having positive refractive power of the lens group of the second lens group has a focal length fp and said lens having negative refractive power of the lens group of the second lens group has a focal length fn so that the following conditional expression is satisfied:

$0.7<|fp/fn|<1.5$.

6. An imaging lens comprising:
a first lens group having negative refractive power;
a stop; and
a second lens group having positive refractive power, arranged in the order from an object side to an image plane side,
wherein said first lens group includes a first lens having a strong concave surface facing the image plane side and negative refractive power; and a second lens having negative refractive power and a shape of a biconcave lens near an optical axis thereof,
said second lens group includes a third lens having a biconvex shape and a lens group,
said lens group is composed of a lens having positive refractive power and a lens having negative refractive power, and has negative refractive power as a whole,
said first lens group has a focal length F1 and said second lens group has a focal length F2 so that the following conditional expression is satisfied:

$-1.0<F1/F2<-0.5$ said lens having positive refractive power of the lens group of the second lens group has a focal length fp and said lens having negative refractive power of the lens group of the second lens group has a focal length fn so that the following conditional expression is satisfied:

$0.7<|fp/fn|<1.5$.

7. The imaging lens according to claim 6, wherein said first lens is formed in a meniscus shape having the concave surface facing the image plane side.

8. The imaging lens according to claim 6, wherein said lens group of the second lens group is formed through joining the lens having positive refractive power and the lens having negative refractive power.

9. The imaging lens according to claim 6, wherein said third lens has a focal length f3 so that the following conditional expression is satisfied:

$1.0<f3/f<2.5$ where f is a focal length of a whole lens system.

* * * * *